United States Patent [19]
Eickhorst et al.

[11] 3,794,424
[45] Feb. 26, 1974

[54] METHOD AND APPARATUS FOR DETERMINING THE COLOR OR CUT DIAMONDS

[75] Inventors: Manfred Eickhorst, Hans-Henny-Jahnn-Weg 21; Godehard Lenzen, both of Hamburg, Germany

[73] Assignee: said Eickhorst, by said Lenzen

[22] Filed: Mar. 4, 1971

[21] Appl. No.: 121,111

[30] Foreign Application Priority Data
Mar. 13, 1970 Germany.................. P 20 11 931.7

[52] U.S. Cl.................... 356/30, 356/188, 356/189, 356/195
[51] Int. Cl............................................. G01j 3/50
[58] Field of Search.............. 356/30, 186, 188–190, 356/195; 250/226

[56] References Cited
UNITED STATES PATENTS
1,744,485   1/1930   Michel et al......................... 356/30
2,960,909   11/1960  Shipley ................................ 356/30
3,418,053   12/1968  Pelavin .............................. 356/246

Primary Examiner—John K. Corbin
Assistant Examiner—F. L. Evans
Attorney, Agent, or Firm—Richards & Geier; V. Alexander Scher

[57] ABSTRACT

The diamond is held by a well known holder below its holder or mounting edge leaving its upper portion with the planar surface and the facets fully exposed. A light ray of a predetermined wave length entering the diamond through the upper planar surface is totally reflected within the diamond in accordance with the geometric configuration of rays and emerging from the facets of the diamond. The amount of attenuation between the entering and the emerging light ray is measured photoelectrically, whereby attenuations of the entering light ray caused by surface reflections and by varying adjustments of the diamond are avoided.

12 Claims, 1 Drawing Figure

PATENTED FEB 26 1974 3,794,424
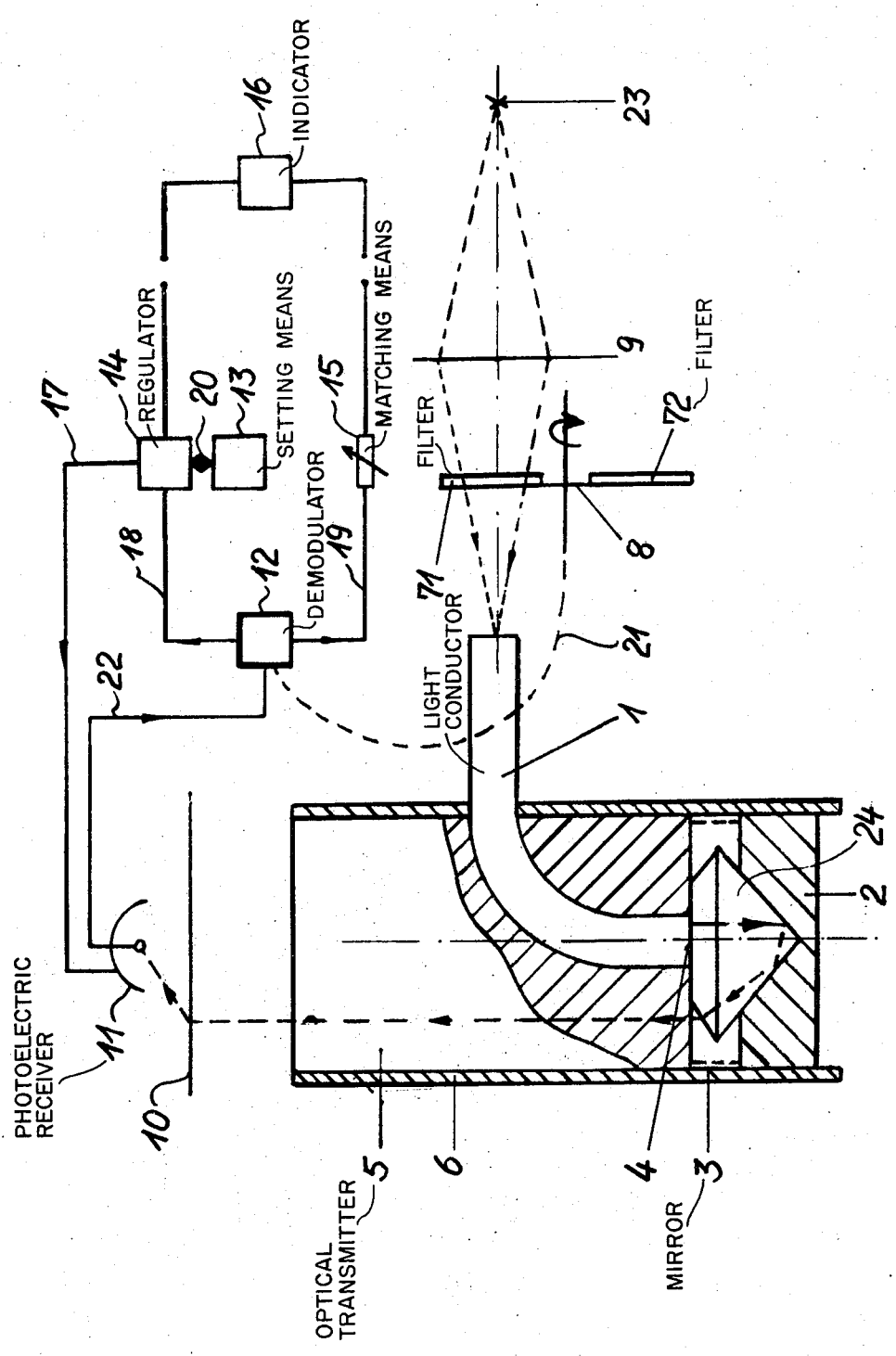

METHOD AND APPARATUS FOR DETERMINING THE COLOR OR CUT DIAMONDS

BACKGROUND OF THE INVENTION

Hitherto it was common practice to either determine the color by visual inspection, or with the aid of the so-called "Ulbricht"-spere which, however, is a very expensive device. While the visual determination presupposes precise knowledges of reference pieces, long training, and great experience, whereby it still remains dependent on subjective influence, the determination method with the aid of the "Ulbricht"-spere is incorrect, in so far as the surface reflections of the light rays entering the diamond are included in the consideration, i.e., they are included in the measured value.

It is a fact, well known to those skilled in the art, that the color of a diamond depends on structural inhomogeneities i.e., that the light entering the diamond and being reflected therein is subjected to an absorption which is the cause of the color. However, if this absorption is to be measured, and the components of the surface reflection are not excluded, this will always lead to incorrect measurement results.

In another known apparatus for examining and registering cut jewels a light beam is used entering a preselected cut surface, preferably the upper planar surface. The rays reflected by the facets are registered in a light sensitive layer after the selected cut surface has been adjusted by suitable means to occupy a defined, repeatable spatial position relative to the axis of the light beam, and the light sensitive layer occupies a defined position relative to the jewel. This apparatus operates in accordance with the recognition that the light beams reflected within the jewel and emerging therefrom may be registered on a light sensitive layer, and that they result for each jewel, provided the jewel may always be brought into an exactly defined and repeatable position, in a specific pattern which practically represents an "identification" of the jewel and may be used to identify the same. This means that at another time and at another location a second diagram may be made, and by comparing the two diagrams it may be determined by registering the image points of the two diagrams whether the same jewel is involved.

Besides the fact that a color determination is absolutely impossible with this apparatus, it always requires an absolutely identical position of the jewel relative to the entering light beam in order to obtain equal images of one and the same jewel, which is afflicted with an enormous technical and thus financial expenditure for such an apparatus. In addition the position of the light sensitive layer and its spacing relative to the jewel must also be defined exactly and maintained constantly. By the provision of a plurality of mirrors a considerable loss of light is caused. Of course, besides these drawbacks the operations of such an apparatus requires great experience and exactness as well in handling the apparatus as also in exploiting and comparing the diagrams.

SUMMARY OF THE INVENTION

Therefore, the main object of this invention is to provide a method and an apparatus for determining the color of cut diamonds which is reproducible at any time particularly for comparison with the internationally known and commercially customary color scale of cut diamonds, wherein the drawbacks of the known methods and apparatii are avoided, wherein the technical expenditure is to be kept low, the possibility of adjustment is as simple as possible, and wherein particularly the subjective errors in operation are to be avoided.

Further objects of the invention include:

1. To provide a method for determining the color of cut diamonds cut according to any pattern by using a ray entering through the upper planar surface of the diamond and being reflected totally according to the geometric configuration of the rays within the diamond, wherein the amount of attenuation between the entering and emerging ray of light of a defined predetermined wave length is measured photoelectrically, whereby attenuations of the entering ray caused by surface reflections and by varying adjustments of the cut diamond are avoided.

2. To provide a method as aforesaid, wherein in one adjusted position of the diamond, or the used measuring apparatus respectively, the amount of attenuation of the entering light rays of at least two predetermined, defined wave lengths is measured and the resulting measured value appears on a measuring apparatus.

3. To provide a method as aforementioned, wherein a monochromatic light of two or more wave lengths is used for the measurement, one of which wave lengths including the maximum absorption of the diamond at $\lambda = 415,5$ nm while the other one is within the range of the visible spectrum above 500 nm.

4. To provide an apparatus for carrying through the aforementioned methods, wherein the following means are combined in functional series:
means for generating selective light rays of at least two defined wave lengths;
a light conductor for such rays;
a holder for the diamond;
a transmitter receiving the rays reflected totally within the diamond;
a photoelectric receiver; and
an electronic circuit fed by said receiver and including a register for the measured values.

5. To provide an apparatus as aforementioned, wherein the means generating the selective light rays consist of a light source and a rotating filter wheel disposed in front thereof the number of filters arranged on the filter wheel corresponding to the number of the desired wave length.

6. To provide an apparatus as aforementioned, wherein the light conductor for the entering rays, the holder for the diamond, and the optical transmitter are forming a unit, wherein the engaging surface of the light conductor and entrance surface of the transmitter are disposed in an optical planar plane, which is contacted by the upper planar surface of the diamond preferable under the force of a spring, and wherein preferably the space formed between the surface of the holder and the optical planar plane is closed by a mirror.

7. To provide an apparatus as aforementioned, wherein the light conductor is at least partly arranged within the optical transmitter, the light conductor and the optical transmitter consisting preferably of flexible fibrous optics, or of light conducting rods surrounded by an encasement.

8. To provide an apparatus as aforementioned, wherein the photoelectric receiver is a variably controllable element with respect to its sensitivity, or its amplification respectively.

9. To provide an apparatus as aforementioned, wherein the electronic circuit comprises a demodulator controlled by the filter wheel and splitting the output signals of the photoelectric receiver, channels receiving the split signals, matching means assigned to one of the channels, and regulating means arranged in an additional channel and connected to setting means and fed back to the photoelectric receiver, wherein the channels are coupled by the indicator of the measured value.

The invention makes use of the fact that each diamond has a defined constant light absorption, due to the structural inhomogeneities depending on the wave length, which is measured according to the invention. The constant difference between the intensity of the entering ray of a defined wave length and the ray totally reflected within the diamond and emerging from the facets of the upper side are measured. This difference, which allows a direct determination of the color of the diamond, may be ascertained anew at any time, if it is assured, according to the prerequisite of the invention that losses or diffusion effects are avoided, and its intensity may be regarded as 100 percent.

In order to provide a difference scale for colors corresponding to the international commercial color scale for diamonds which contains absolute values which, at one time, have been determined empirically based on reference diamonds, and which are repeatable any time, it is possible, according to the invention, to obtain a value exactly defining the color, which is not effected by any sources of failures of the apparatus, or errors of the operator. This is achieved by the fact that in one adjustment of the cut diamond, or the employed measuring means respectively, the attenuation amount of the entering light of at least two predetermined wave lengths is measured. In this manner initially the attenuation amount of the two predetermined wave lengths is determined allowing to calculate for each one thereof the transmission of the diamond and based on these transmissions of the two predetermined wave lengths a quotient may be formed, representing an absolute constant for each diamond, because by forming the quotient, errors appearing in equal extents when the transmissions for both wave lengths are determined are nullified, since the measurement takes place in one adjustment of the diamond, or the apparatus respectively. In this manner, for example, errors are eliminated caused by subjective deficient operations, such as faulty positioning of the diamond in the holder of the apparatus, or adjustment deviations of the entering light, but also technical faults in the finish of the diamond, which may be caused by a geometrically inexact cut. It will be understood that defective cuts will cause diffusion and loss effects of the entering light, wherein such effects may also be caused, for example, by obliquely entering light, caused by inaccuracies of the apparatus. But since, according to the method of this invention, at least two different wave lengths in one adjacent are used for comparison measuring, such errors are eliminated in forming the quotients of the transmission values, or absorption values respectively.

It was found to be particularly advantageous to use monochromatic light of two wave lengths for comparison measuring, one of these wave length including the absorption maximum of the diamond at $\lambda = 415,5$ nm, while the other wave length is within the range of the visible spectrum above 500 nm. The reason for using just these wave lengths is to be seen in the fact that the commercially relevant grade of the yellow saturation of cut diamonds is due to an especially high absorption in the blue range of the spectrum on the one hand, and an especially little absorption in the green-yellow range of the spectrum, meaning that the yellow concentration of a diamond is defined by the strength of the absorption maximum.

In this the second wave length represents a reference wave length.

In order to eliminate errors still more safely, and in order to also allow the determination of diamonds with other degrees of coloring, for example a brownish or greenish basic coloring, which are also contained in the commercial scale of the yellow saturation, a modified method of the invention provides to use monochromatic light of more than two wave lengths for measuring, one of which including the absorption maximum of the diamond at $\lambda = 415,5$ nm while the other one is within the range of the visible spectrum above 500 nm. For example, in case of three wave lengths the quotient is formed of the value derived from the wave length for $\lambda = 415,5$ nm and of one of the two higher wave lengths, while the third measurement serves to obtain a correction factor.

Followingly the invention shall be described in connection with the attached diagrammatic drawing showing an apparatus for carrying through the method according to the invention, which is simple in construction, easy to handle, inexpensive, and assures the required possibility of reproduction.

DESCRIPTION OF THE PREFERRED EMBODIMENT

The apparatus according to the invention shown in the drawing comprises a light conductor 1 for the entering rays, a holder 2 for a diamond 24 which, in this case, has the facet pattern of a brilliant, and an optical transmitter 5 construed to form a unit having, particularly the optical transmitter 5, a cylindrical shape including an outer corresponding cover 6.

The light conductor 1 and the optical transmitter 5 are arranged in such a manner that their surfaces facing the diamond are disposed in an optical planar plane 4. In order to eliminate losses of intensity the space formed between the surface of the holder 2 and the optical planar plane 4 is closed by a mirror 3. After a diamond has been placed in the holder 2 it is tightly urged against the optical planar plane 4 by any suitable means, such as a spring. It is important that the upper planar surface of the cut diamond, in this case a brilliant, contacts the plane 4 in an optical unique manner in order to avoid reflections or other diffusions.

The holder 2 for the diamond 24 is constructed in such a manner that the diamond is supported below its holder or mounting edge, while the upper portion of the diamond, that is the portion disposed above the mounting edge, is fully exposed so that all of the light is reflected according to the geometric configuration of the rays within the cut diamond and freely emerges out of the upper portion and gets into the optical transmitter 5. As will be seen in the drawing the holder 2 includes a receiving cone cut in accordance with the cut pattern of the underside of the diamond 24, whereby the diamond may be inserted without any difficulties and the holder may be used for diamonds of different sizes all having the same cut pattern, i.e., for greater and smaller brilliants since, as is well known, the apex angle of the lower portion is always equal in case of brilliants. Of course it will be understood that in case of diamonds having a cut pattern deviating from that of brilliants correspondingly shaped holders must be provided which is possible without particular difficulties and technical expenditures for anyone skilled in the art.

The light conductor 1 as well as the optical transmitter 5 may be formed by a flexible fibrous optic, or also by a light conducting rod fed by means generating light consisting substantially of a source of light 23 and a filter wheel 8 arranged between the source of light and the light conductor 1, while therebetween an image-forming optic 9 is arranged in a known manner. The filter wheel 8 has two filters 71, 72 arranged thereon each only allowing the passage of light of a desired wave length. Thus, in the exemplified embodiment the light conductor 1 and thus also the diamond only receives light of two wave lengths. However, it is self-evident that also more than two filters may be provided, whereby it is possible to generate monochromatic light of more than two wave lengths. In the illustrated embodiment the one filter 71 is provided for light corresponding to the wave length $\lambda_1 = 415,5$ nm representing the maximum absorption of diamonds, while the other filter 72 allows the passage of light with a wave length of $\lambda_2 = 520$ nm.

Behind the optical transmitter 5 a further image-forming optic 10 is arranged bundling the light and projecting it upon a photoelectric receiver 11, which may be a photo resistance or, as in the present case, a photo multiplier in form of a secondary electronic multiplier. The sensitivity, or amplification respectively, of this photoelectric receiver 11 is variably controllable.

The photoelectric receiver 11 is connected to a demodulator 12 from which two channels 18, 19 emerge conducting the signals split by the demodulator 12, which for synchronized control is connected to the filter wheel 8. The two channels 18, 19 are coupled to each other by an indicator 16 for the measured value and the channel 19 includes matching means 15, while in channel 18 regulating means 14 including setting means 13 are provided. The regulating means 14 is fed back to the photoelectric receiver 11.

The operation, or handling respectively, of the apparatus shall followingly be described.

Initially the apparatus is standardized, or matched respectively, by placing, instead of a diamond 24, a mirror under 45° below the planar plane 4. Light of the source of light 23 bundled by the image-forming optic impinges upon the two filters 71 and 72 of the rotating filter wheel 8, and each of the filters allows only the passage of light of a defined wave length. The light passing the light conductor 1 impinges upon the mirror and is reflected to impinge via the optical transmitter 5 and the second image-forming optic 10 upon the photoelectric receiver 11 which trasforms it into an electrical transmission signal 22 fed to the demodulator 12 which demodulates the signals 22 derived from the filter wheel 8 and synchronized by the connection 21 and separates and feeds them to the associated channel 18, or 19 respectively. Now, the matching of a signal regarding its level takes place which is fed from the setting means 13 to the regulator 14, while the feed-back 17 takes care that the sensitivity of the photoelectric receiver 11 is adjusted so that the signal in channel 18 has the same level as the signal in channel 19. Thus the gauging of the apparatus is accomplished if the value appearing at the indicator of the measured value equals 1, i.e., when the two intensities of the two used wave lengths are equal, and thus the quotient thereof is 1.

After the apparatus has been gauged the cut diamond is placed in the holder 2 and urged in tight contacting engagement against the optical planar plane 4. Now the path of rays is evidently the same as during the gauging process. However, due to the structure of the diamond and the two wave lengths being used, two different signals are received in the channels 18 and 19. The signal in channel 18 is compared with the signal of the setting means 13, and, if necessary, is readjusted by means of the feed-back 17. Since the sensitivity of the photoelectric receiver 11 is altered by this feed-back 17, the signal in channel 19 will be altered the same amount. The change of this amount appears at the indicator 16 of the measured value and corresponds to the quotient of the two measured transmissions. This quotient represents a constant of the measured diamond, which may be measured anew, at any time, and anywhere.

For the sake of completeness it must be mentioned that self-evidently the contacting surface of the optical transmitter 5 is always greater than the diameter of the upper planar surface of the diamond to be measured, while the exit cross sectional area of the light conductor 1 should be smaller, or at the utmost equal to the diameter of the upper planar surface. By means of these interrelated dimensions self-adjustment of the diamond with respect to the optical planar plane 4 is achieved eliminating any tilting, whereby always unambiguous conditions, regarding the entering and emerging rays, are obtained, and wherein further the invention makes use of the fact that all of the totally reflected light must impinge upon the optical transmitter, since the light conductor 1 as light emitting element can not absorbe rays. This is based on the physical principle that a source element can not be a depression.

It will be readily comprehensible to any one skilled in the art that any homogeneous, light-transmissive material may be used for the optical transmitter 5, and also a cylinder with inwardly arranged mirrors may be used. Further, the photoelectric receiver may be arranged directly on the optical transmitter 5, whereby the construction of the apparatus may still be simplified, since practically the image-forming optic 10 is eliminated.

What I claim:

1. An apparatus for determining the color of cut diamonds of any cut pattern comprising in combination and in functional series arrangement
    means for generating selective light beams of at least two defined wave lengths,
    a light conductor for such rays,
    a holder for the cut diamond,
    an optical transmitter receiving the rays which are totally reflected within the diamond,
    a photoelectric receiver, and
    an electronic circuit fed by said receiver and including a register for the measured value.

2. An apparatus as claimed in claim 1, wherein the light conductor for the incident rays, the holder for the diamond, and the optical transmitter constitute a structural unit, wherein the emerging surface of the light conductor and the entrance surface of the transmitter are disposed in an optical planar common plane against which the upper planar surface of the diamond is biased in contacting engagement.

3. An apparatus according to claim 2, wherein the space formed between the surface of the holder and the optical planar plane is closed by a mirror.

4. A apparatus as claimed in claim 2, wherein the light conductor is at least partly disposed within the optical transmitter.

5. An apparatus as claimed in claim 2, wherein the light conductor and the optical transmitter consist of flexible fibrous optics.

6. An apparatus as claimed in claim 2, wherein the light conductor and the optical transmitter consist of encased light conducting rods.

7. An apparatus as claimed in claim 1, wherein the photoelectric receiver is a variably controllable element with respect to its sensitivity.

8. An apparatus in accordance with claim 6, wherein said light conductor is located within and surrounded by said optical transmitter.

9. An apparatus as claimed in claim 1, wherein the photoelectric receiver is a variably controllable element with respect to its amplification.

10. An apparatus as claimed in claim 1, wherein the electronic circuit comprises a demodulator controlled by said means for generating selective light beams of at least two defined wave lengths, said means being in the form of a rotatable filter wheel, said demodulator splitting the output signals of the photoelectric receiver, two channels receiving the split signals, adjustable resistance means in one of the two channels, and a regulator in the other of the two channels, a set-point adjustment, said regulator being connected to said set-point adjustment and back-coupled to said photoelectric receiver, whereby the two channels are coupled to the register for the measured values.

11. A method for determining the color of cut diamonds of any cut pattern, especially the pattern of a brilliant cut, comprising the steps of projecting beams of at least two defined predetermined wave lengths of monochromatic light one after the other into the planar upper surface of the diamond being examined, and measuring photoelectrically the amount of attenuation of two reflected beams emerging from the facets of the upper side of the diamond parallel to and in opposite direction to the projected beams.

12. A method for determining the color of cut diamonds according to claim 11, wherein monochromatic light beams of more than two wave lengths are used for measuring, one wave length including the maximum absorption of the diamond at $\lambda = 415,5$ nm, while the other wave lengths are within the range of the visible spectrum above 500 nm.

* * * * *